United States Patent
Mustapha et al.

(10) Patent No.: US 7,366,970 B2
(45) Date of Patent: Apr. 29, 2008

(54) METHOD AND TEST DEVICE FOR DETECTING ADDRESSING ERRORS IN CONTROL UNITS

(75) Inventors: Adnan Mustapha, Maulbronn (DE); Dieter Woerner, Kleingartach (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 164 days.

(21) Appl. No.: 10/497,351

(22) PCT Filed: Nov. 28, 2002

(86) PCT No.: PCT/EP02/13427

§ 371 (c)(1),
(2), (4) Date: Nov. 23, 2004

(87) PCT Pub. No.: WO03/048212

PCT Pub. Date: Jun. 12, 2003

(65) Prior Publication Data
US 2005/0081133 A1  Apr. 14, 2005

(30) Foreign Application Priority Data
Nov. 29, 2001  (DE) ................... 101 58 406

(51) Int. Cl.
*G06F 11/00* (2006.01)
(52) U.S. Cl. ............ 714/799; 714/718
(58) Field of Classification Search ............ 714/799, 714/719, 718, 724, 730, 734, 736, 738, 742, 714/743; 365/189.07, 201; 303/122.08; 318/560
See application file for complete search history.

(56) References Cited

U.S. PATENT DOCUMENTS

| | | | |
|---|---|---|---|
| 4,700,304 A | 10/1987 | Byrne et al. | |
| 4,742,486 A * | 5/1988 | Takemae et al. | 365/189.07 |
| 4,864,202 A * | 9/1989 | Nitschke et al. | 318/560 |
| 5,258,986 A | 11/1993 | Zerbe | |
| 5,661,729 A * | 8/1997 | Miyazaki et al. | 714/719 |
| 5,713,643 A * | 2/1998 | Esselbrugge et al. | 303/122.08 |
| 5,959,911 A * | 9/1999 | Krause et al. | 365/201 |
| 6,087,929 A | 7/2000 | Charzinski et al. | |
| 6,185,490 B1 | 2/2001 | Ferguson | |
| 6,311,299 B1 * | 10/2001 | Bunker | 714/719 |
| 6,862,703 B2 * | 3/2005 | Oonk | 714/718 |

FOREIGN PATENT DOCUMENTS

| | | |
|---|---|---|
| DE | 691 30 693 T3 | 7/1999 |
| EP | 0 472 818 B1 | 3/1992 |
| GB | 2 125 578 A | 3/1984 |
| JP | 61264600 | 11/1986 |
| JP | 2128260 | 5/1990 |

OTHER PUBLICATIONS

Examination Opinion in Japanese Patent Application No. 2003-548083 dated Dec. 25, 2007.

* cited by examiner

*Primary Examiner*—Shelly Chase
*Assistant Examiner*—Fritz Alphonse
(74) *Attorney, Agent, or Firm*—Crowell & Moring LLP

(57) ABSTRACT

The invention relates to a method for detecting addressing errors in control devices of motor vehicles, whereby test data are input into all addressable memory cells by means of a present model, then read out and compared with the test data.

13 Claims, 1 Drawing Sheet

METHOD AND TEST DEVICE FOR DETECTING ADDRESSING ERRORS IN CONTROL UNITS

BACKGROUND AND SUMMARY OF THE INVENTION

The present invention relates to a method and a test device for detecting addressing errors in control units.

For safety reasons, control units for motor vehicles and, in particular, for braking systems and systems controlling the dynamics of the vehicle movement, such as ABS, ASR, ESP and similar systems, have a redundant construction with two microprocessors which monitor one another.

For reasons of cost, however, control units are also applied which use only one microprocessor.

An important monitoring operation consists of testing whether certain memory cells can be written to and read.

In practice, so-called addressing errors also occur; that is, during a writing operation onto a certain memory cell, a different cell is unintentionally inscribed. It may occur in this case that only the wrong, that is, the non-addressed cell is inscribed, or that the addressed as well as a non-addressed cell are inscribed. Specifically, the latter error cannot be detected by means of conventional test devices.

It is therefore an object of the invention to further develop a method and a test device of the above-mentioned type such that any addressing errors are also detected in a perfect manner.

This object is achieved by a method and test device for detecting addressing errors in control units, wherein test data preset when the control unit is switched off by the user are written into all addressable memory cells, and are subsequently read out again and are compared with the test data. Advantageous embodiments and further developments are described and claimed herein.

It is the basic principle of the invention to write test data, which are preset when the control unit is switched off by the user, into all addressable memory areas, to subsequently read them out again, and to compare them with the test data.

The preset test data are preferably defined such that different test data are available for each addressable area.

According to a further development of the invention, several different test data are written into the addressable memory cells and are read out again in a successive manner with respect to time. According to another further development of the invention, the test data are preset such that a certain byte of an address, preferably the low byte, is written into the memory cell of this preset address.

According to another further development of the invention, the results of the comparison are stored and, if an error is detected, it is signalled to the user when the control unit is switched back on.

In the following, the invention will be explained in greater detail by means of an embodiment in connection with the drawing.

BRIEF DESCRIPTION OF THE DRAWING

The single

DETAILED DESCRIPTION OF THE DRAWING

Figure 1:
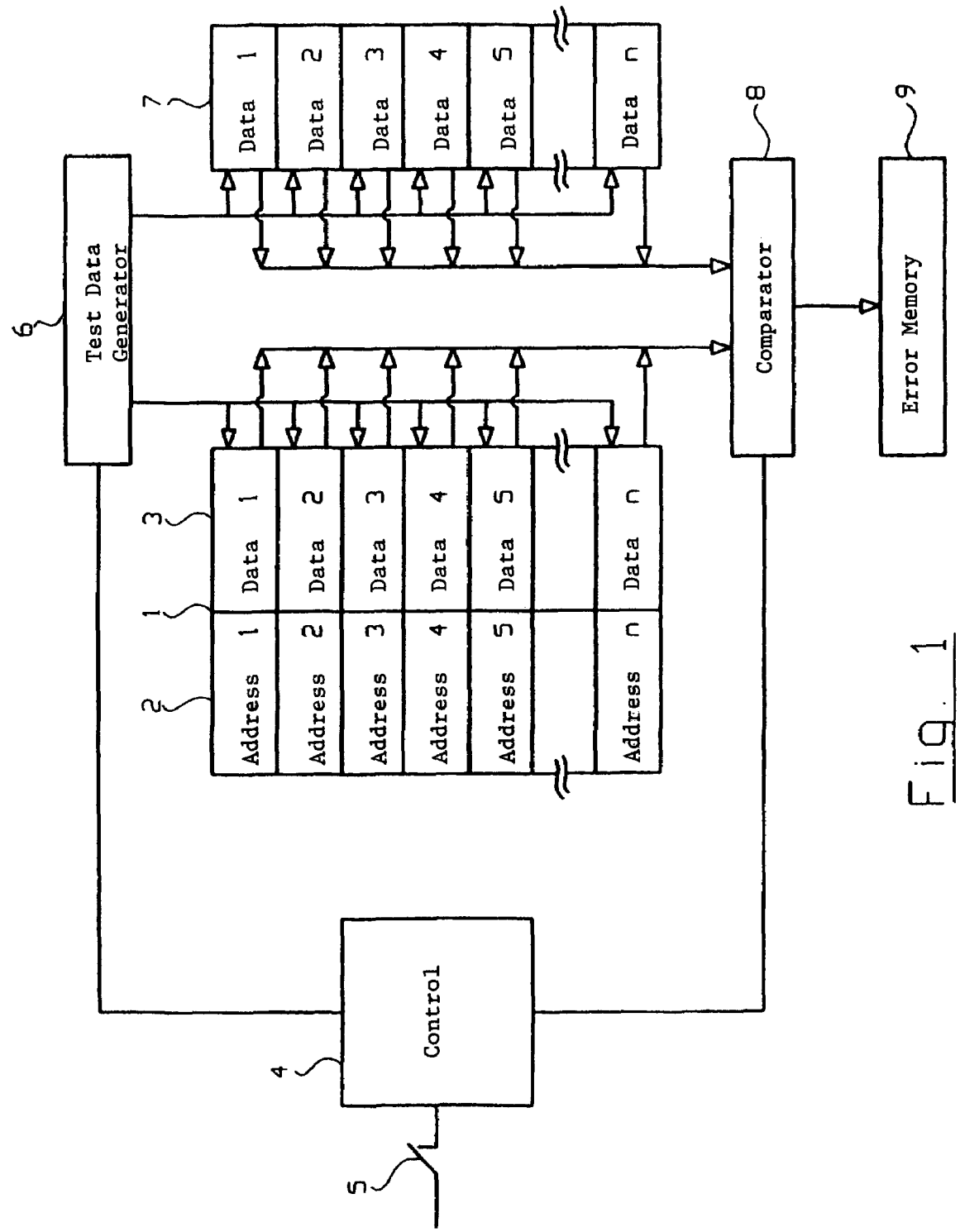
FIG. 1 is a schematic diagram of the test device according to an embodiment of the invention.

The control unit has an addressable memory 1 with a plurality of individually addressable memory cells 3, into which data (piece of data 1 to piece of data n can be written in and can be read out from there. The addresses (address 1 to address n) of these memory cells 3 are marked by reference number 2. A control 4 detects whether the normal operation of the control unit of a vehicle has been concluded, for example, in that the ignition switch 5 is opened. The control 4 will then initiate that a test data generator 6 for all addresses (address 1 to address n) writes respective predetermined models of data into the memory cells 3, specifically preferably according to a preset model. These data are also available for a later comparison, for example, in an intermediate memory 7. After this writing operation, the control 4 initiates that the data are read out and are fed to a comparator 8, where they are compared with the intermediately stored data from the intermediate memory 7. If the data read out of the memory 1 do not correspond to the intermediately stored data from the intermediate memory 7, an error message is emitted to an error memory 9 and is stored there. When the ignition switch 5 is switched on again, a reading takes place out of the error memory 9 and is indicated to the driver in a display by means of warning lights or acoustic indicating devices.

In practice, the functions of the control 4, of the test data generator 6, of the intermediate memory 7 and of the comparator 8 can be taken over by a microcontroller, in which case the intermediate memory 7 also does not have to be physically present, because the test data are generated by the microcontroller according to a preset model and can therefore be reproduced at any time.

After the switching-off of the control unit, thus, for example, when the driver switches off the ignition, and it is therefore known that the control unit is not used for its normal function, such as an ABS control, a comprehensive and therefore time-intensive test is carried out, which cannot be implemented during the normal control functions.

After the switching-on of the control unit, a rough test can additionally be carried out during which predefined data are written into the cells to be tested and, after each writing operation of a cell, the complete memory is read out, and it is checked whether these data actually exist only at the one predetermined address.

Thus, not only the normal memory errors, that is, whether or not a cell can be inscribed, but also addressing errors, can be determined by means of the invention.

The invention claimed is:

1. A method of detecting addressing errors in a control unit, the method comprising the acts of:
    writing preset test data of a preset model in a successive manner with respect to time into all addressable memory cells of the control unit while the control unit is deactivated by a user with respect to a normal operation;
    subsequently reading out and comparing data from the addressable memory cells with the test data;
    generating an error message, if applicable, as a function of the comparing act; and
    wherein for all addressable memory cells, different test data are written in accordance with the preset model, and wherein the error message is stored if applicable and emitted only when the control unit is reactivated.

2. The method according to claim 1, wherein different models of test data are written in successively with respect to time.

3. The method according to claim 2, wherein the preset model is a defined byte of a respective address of the memory cells.

4. The method according to claim 1, wherein the preset model is a defined byte of a respective address of the memory cells.

5. A test device for detecting addressing errors in a control unit having an addressable memory with several individually addressable memory cells, comprising:
   a test generator which writes a preset model of test data into the individually addressable memory cells;
   a comparator which reads out the test data previously written into the individually addressable memory cells and compares the read out test data with the preset model of test data;
   a control operably coupled to activate the test data generator when the control unit is deactivated with respect to its normal operation;
   an error memory coupled to the comparator, in which faulty comparison results are stored and emitted only when the control unit is reactivated.

6. A method for detecting addressing errors in control units, the method comprising the acts of:
   inputting test data into all addressable memory cells of the control unit via a preset model when the control unit is switched-off by the user;
   subsequently reading out the input test data; and
   comparing the subsequently read out input test data with the test data input via the preset model in order to detect any errors.

7. The method according to claim 6, wherein the preset model writes in different test data for each of the individually addressable memory cells.

8. The method according to claim 7, wherein different models of test data are written in successively with respect to time.

9. The method according to claim 6, wherein the preset model is a selected byte of a respective address of the addressable memory cells.

10. The method according to claim 6, wherein, as a function of the comparing act, an error message is generated and stored, the error message being emitted when the control unit is switched on again.

11. A test device for detecting addressing errors in a control unit having an addressable memory with several individually addressable memory cells, comprising:
   a test data generator operably coupled to write into the individually addressable memory cells test data in accordance with a preset model;
   a comparator operably configured to read out the previously written in test data from the individually addressable memory cells and compare the read out test data with the written in test data in accordance with the preset model in order to detect addressing errors; and
   a control operably configured to activate the test data generator when the control unit is switched-off.

12. The test device according to claim 11, further comprising:
   an error memory coupled to the comparator, in which said error memory faulty comparison results are stored and are emitted when the control unit is switched back on via a switch.

13. The test device according to claim 11, further comprising:
   an error memory coupled to the comparator, in which said error memory faulty comparison results are stored and are emitted when the control unit is switched back on via a switch.

* * * * *